United States Patent [19]

Medin et al.

[11] Patent Number: 5,936,621
[45] Date of Patent: *Aug. 10, 1999

[54] SYSTEM AND METHOD FOR REDUCING FLICKER ON A DISPLAY

[75] Inventors: David Medin, Los Altos; Paul J. Weihs, Sunnyvale, both of Calif.

[73] Assignee: Innovision Labs, Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/672,597

[22] Filed: Jun. 28, 1996

[51] Int. Cl.$^6$ .................................................. G09G 5/00
[52] U.S. Cl. ......................................... 345/213; 348/910
[58] Field of Search .................................... 348/910, 607, 348/447, 448, 568; 345/213, 20, 29, 137, 136, 147; 315/370

[56] References Cited

U.S. PATENT DOCUMENTS

| | | | |
|---|---|---|---|
| 4,454,506 | 6/1984 | Netravali et al. | 365/136 |
| 4,799,105 | 1/1989 | Mitchell et al. | 348/910 |
| 4,888,529 | 12/1989 | Madsen et al. | 315/370 |
| 5,146,309 | 9/1992 | Flamm | 348/910 |
| 5,510,843 | 4/1996 | Keene et al. | 348/446 |

*Primary Examiner*—Dennis-Doon Chow
*Attorney, Agent, or Firm*—Sawyer & Associates

[57] ABSTRACT

A system and method for reducing flicker in a display system using a flicker reduction circuit. The display includes a series of scan lines, each of which includes a set of pixels. The display is controlled by a video signal, which includes a series of video lines containing control variables that control the intensity of the pixels in the corresponding scan line. In one embodiment of the flicker reduction circuit, the flicker reduction circuit receives two of the video lines as input, and delays one of the one video lines using a memory, such that its control variables are synchronized in time with the other undelayed video line. The difference between the intensity of the synchronized pairs of control variables is determined, and the difference is fed into a look-up table. Based on the difference, the look-up table provides a control value that is then applied to one of the original synchronized control variables to provide a modified control variable that reduces flicker on the display screen.

32 Claims, 4 Drawing Sheets

SYSTEM AND METHOD FOR REDUCING FLICKER ON A DISPLAY

FIELD OF THE INVENTION

The present invention relates to display systems, and more particularly to a system and method for reducing flicker on a display screen.

BACKGROUND OF THE INVENTION

A video signal to be displayed on a display screen may either be analog data from a television camera, or digital data that is stored as a virtual screen in a display memory. To produce a color picture on the display screen, the signal controls a triple set of electron beams that scan across the surface of the screen from left to right and down the screen from top to bottom. When a beam reaches the end of a horizontal line, it is turned off and moved to the left edge of the screen one line down and begins to scan the next line. A picture created using this technique is called a raster scan.

The video signal includes a series of chromanance and luminance values that control the intensity of the electron beam, which in turn controls the amount of illumination produced at each pixel location in the scan line. As the electron beams pass over the phosphors that comprise each pixel the phosphors are exited and emit the desired color of light. After the beams pass, the light intensity begins to decay.

The rate of decay is called the phosphor's persistence. Long persistence means that it takes longer for the light intensity to decay and a short persistence means the light intensity decays quickly. The screen refresh rate can be slow when a long-persistence phosphor is used, but if the phosphor decays too slowly, moving images on the screen may appear to smear as they are moving.

When a short-persistence phosphor is used, a higher screen refresh rate must be used to refresh the decaying phosphors. The problem with high refresh rates is that they place high performance requirements on the display system. Early graphic systems refreshed the screen at a rate of 25 to 30 Hz, or 25 to 30 times a second. Even with long-persistence phosphors, it has been shown that this rate will produce a sensation of flicker, rather than a stable image.

Interlacing is a process that has long been used to reduce the amount of flicker on a display screen. During interlacing, an image is produced on the screen by scanning all the odd lines on the screen first, followed by the even lines. Although interlacing makes it difficult to detect flicker for large and fast moving objects, displaying objects that have high-contrast horizontal lines still results in annoying flicker.

A traditional method for reducing flicker even further is by passing the video signal through a flicker filter. Flicker filters attempt to reduce flicker by eliminating the high vertical frequency component of the video signal. Since flicker is caused by high contrast, eliminating the high frequency component of the video signal effectively smooths the signal, but also smears the signal across more scan lines. The problem with smearing the signal is that it reduces the resolution of the image. Therefore, traditional flicker filters force a trade-off between the amount of flicker the signal will produce and the signal's resolution. Traditional flicker filters also are indiscriminate in that they process color portions of the signals, rather than only the black and white flicker causing portions of the signal. Thus traditional flicker filters are inefficient and over process the data.

Accordingly, what is needed is an improved system and method for reducing flicker on a display screen. The present invention addresses such a need.

SUMMARY OF THE INVENTION

The present invention provides a system and method for reducing flicker in a display system, which includes a set of N video lines from a video signal. Each of the N video lines includes a respective sequence of control variables. The method and system includes a synchronization function coupled to the N video lines for synchronizing the respective control variables therein. At least one control means coupled to the synchronization function applies a non-additive function to the synchronized control variables and provides a respective control value based on the result of the non-additive function. The system and method further includes means for applying the respective control value to the sequence of control variables to reduce flicker on the display.

According to the system and method disclosed herein, the present invention provides a flicker reduction circuit that provides a control value based on a weighted value calculated between two or more control variables. If the ratio of black to white for control variables in adjacent video lines do not pass a certain threshold, then those control variables are not modified by the control value, thereby avoiding over processing the input data.

DESCRIPTION OF THE INVENTION

The present invention relates to an improvement in flicker reduction for display systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features descnrbed herein.

Figure 1:
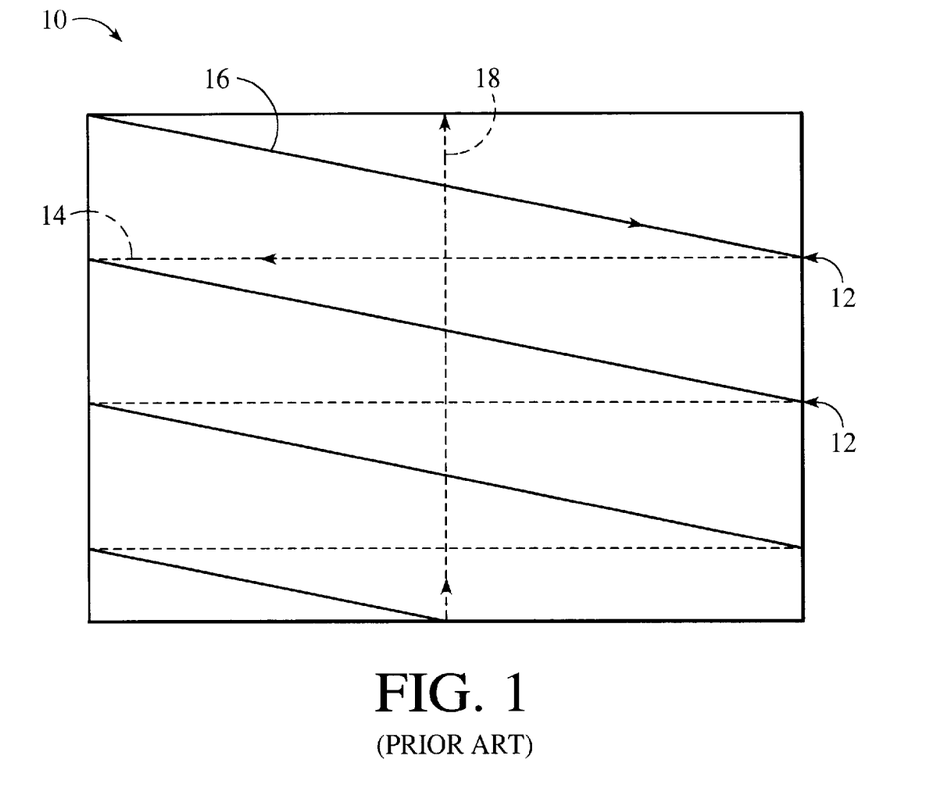
FIG. 1 is a block diagram depicting a display screen undergoing a raster scan process.

FIG. 1 is a block diagram depicting a display screen 10 undergoing a raster scan process. The display screen 10 includes a succession of horizontal scan lines 12, each of which includes a series of pixels 14. As stated above, an image or frame is displayed on the screen as an electron beam (not shown) scans across each scan line 12 from left-to right At the end of each scan line 12, the beam is swept rapidly back to the left during a process called horizontal retrace 16. If the screen 10 is non-interlaced, then the beam is moved down to the next scan line 12, whereas if the screen 10 is interlaced, then the beam is moved down two scan lines 12. When the beam reaches the bottom of the screen 10, the beam is swept rapidly back to the top during a process called vertical retrace 18. The intensity of the beam over each pixel 14 in a scan line 12 is controlled by a video signal, and during both a horizontal retrace 16 and a vertical retrace 18 the video signal turns off the beam.

Figure 2:
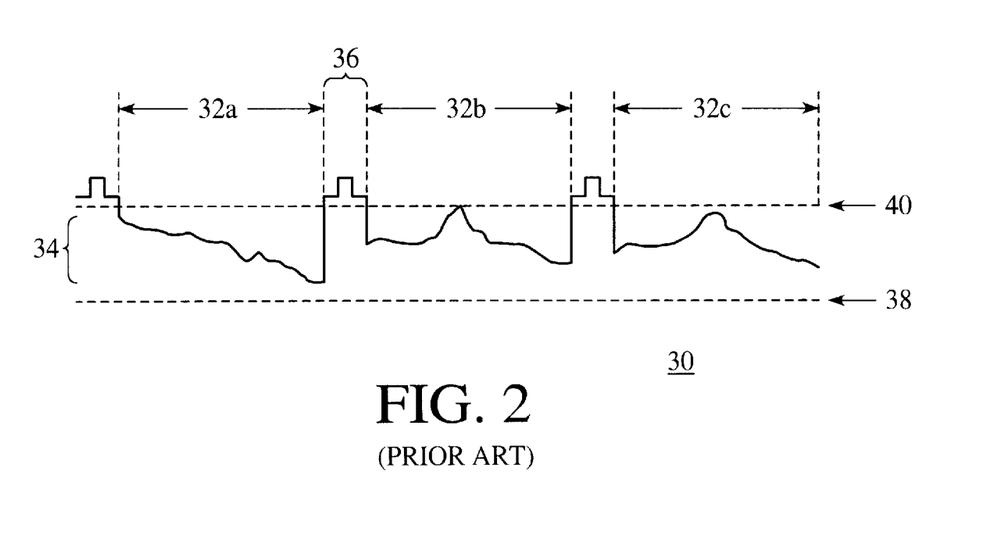
FIG. 2 is a block diagram depicting a standard analog video signal.

FIG. 2 is a block diagram depicting a conventional analog video signal 30. The video signal 30 includes a series of video lines 32, shown here as 32a, 32b, and 32c, each of which corresponds to scan lines 12 on a display screen 10. Each video line 32 includes a series of values, referred to here as a control variables 34, that control the chromanance and luminance for N pixels 14 in a scan line 12, where the number N of control variables 34 in a video line 32 depends on the resolution of the image. The end of each video line 32 is followed by a horizontal blanking pulse 36, which functions to turn-off electron beam during a horizontal retrace 16. If a video line 32 occurs at the bottom of the screen 10, then the horizontal blanking pulse 36 is replaced by a vertical blanking pulse (not shown) that has a longer blanking interval.

For an analog video signal 30, the control variables 34 in each video line 32 are represented by voltages, where white is represented by a small positive voltage, shown by reference line 38, and black by a larger positive voltage, shown by reference line 40. In the example shown, video line 32c is at a medium gray level most of the way across with a blacker portion in the middle. Images having video lines 32 that have a high contrast between black and white values produce flicker.

One way to reduce flicker is to interlace the scan lines 12 by scanning every other video line 32 in the video signal 30 first, and then repositioning the beam at the top of the screen and scanning in a second set of lines that is interlaced with the first Assuming that the beam scans the first set of lines at a rate of thirty scans of the screen per second, and the second set at the same rate, then the screen is refreshed 60 times per second. Although interlacing reduces flicker for some images, flicker generally remains detectable with high contrast images. And as display screens become larger, refresh rates as high as 80 to 100 Hz may be required to eliminate flicker, which places a large burden on the display system.

To reduce the burden of high refresh rates on display systems while still reducing flicker, some display systems employ real-time flicker filter circuits. There are generally three categories of flicker filters: convolution, correlation and synthetic. Convolution and correlation flicker filters are linear time casual systems that attempt to reduce flicker by providing a summation of weighted values of the input data in order to reduce the high frequency component of the video line 32 being displayed.

Figure 3:
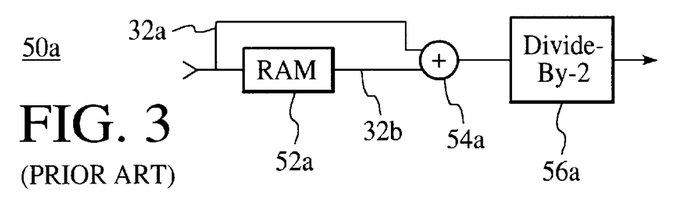
FIGS. 3–6 are diagrams illustrating conventional real-time flicker filters.

FIGS. 3–6 are diagrams illustrating traditional real-time flicker filters. A standard basic flicker filter 50a is shown in FIG. 3. The flicker filter 50a accepts a linear progression of video lines 32 as input, and operates on two input video lines 32a and 32b at once. One video line 32b is delayed by a random access memory (RAM) 522, so that its sequence of control variables 34 are synchronized in time with the control variables 34 in the second video line 32a. After the two video lines 32a and 32b are synchronized, each pair of synchronized control variables 34 from the two video lines 32a and 32b are summed by an adder 54a, and the output of the adder 54a is input to a divide-by-two function 56a to divide the summed value by a factor of two.

Figure 4:
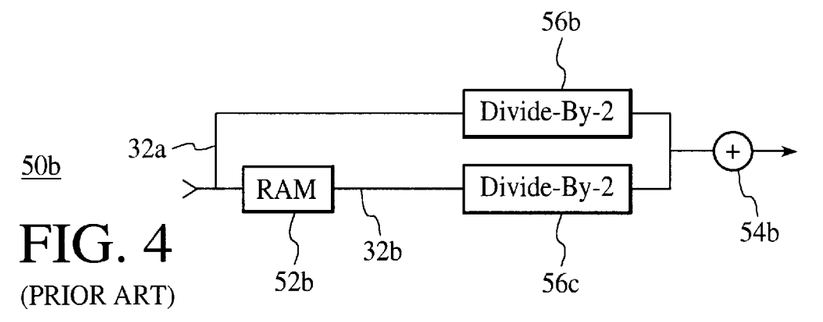

FIG. 4 illustrates an alternative flicker filter 50b in which a control variable from video line 32a is divided by two using a divide-by-two function 56b, and the corresponding synchronized control variable from the delayed video line 32b is divided by using a second divide-by-two function 56c. The two resulting values are then summed by an adder 54b to provide the output. In both flicker filters 50a and 50b, a divide-by-two function is necessary because two values are being added, but the output needs to be unity gain; therefore the value must be divided by two.

Flicker filters are also capable of operating on more than two video lines 32 at once. In general, to synchronize N video lines 32, N−1 video lines 32 of RAM 52 are needed. Thus, to synchronize two video lines 32, one memory 52 is used, as shown in FIGS. 3 and 4, and to synchronize three video lines 32, two memories 52 are used, as shown in FIGS. 5 and 6.

Figure 5:
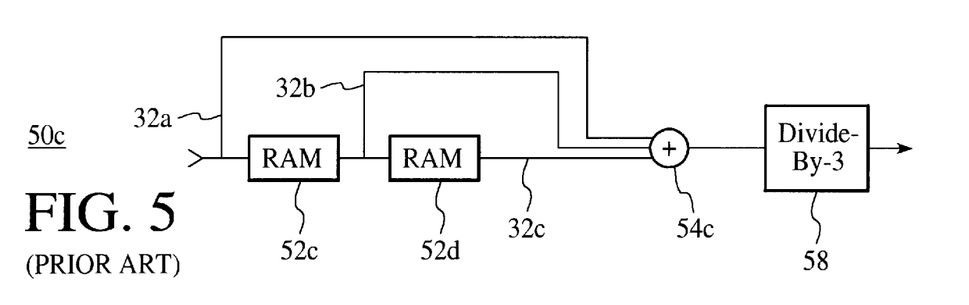

FIG. 5 is a diagram illustrating a three-tap flicker filter 50c that operates on three video lines 32a, 32b and 32c. As shown, video line 32a is undelayed, while memories 52c and 52d are used to delay video lines 32b and 32c, respectively. Each synchronized set of control variables 34 from the undelayed video line 32a and the two delayed video lines 32b and 32c are summed by an adder 54c, and the sum is divided by a divide-by-three function 58 to provide a single gain.

The flicker filters 50 shown in FIGS. 3–5 are each variations on the weighting and number of control variables 34 that are summed. Accordingly, each flicker filter 50 produces a certain filtering action. For example, since the synchronized control variables 34 from the basic two-line flicker filters 50a and 50b of FIGS. 3 and 4 are summed equally, the basic flicker filters 50a and 50b are shown having a 50—50 weighting, but could be modified to have a 60-40 or 40-60 weighting. Like the basic flicker flickers, the three-tap flicker filter 50c equally sums the synchronized control variables 34 from the three video lines 32a–32c. Therefore, the three-tap flicker filter 50c is said to have a weighting of 1-1-1. Other weighting ratios are also possible to produce different types of filtering functions, as shown in FIG. 6.

Figure 6:
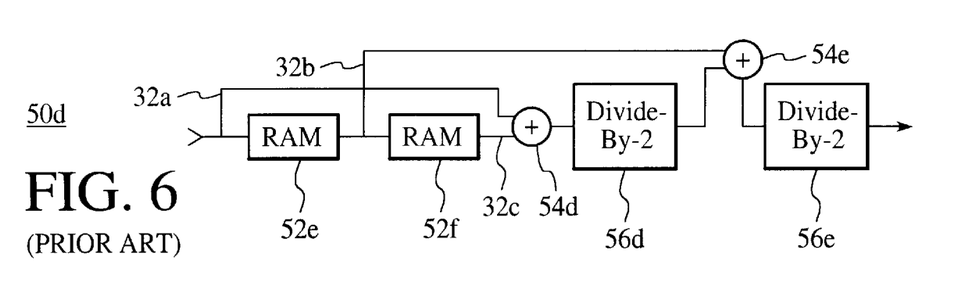

FIG. 6 is a diagram illustrating a second type of three-tap flicker filter 50d. Instead of the adder 54c and divide-by-three 58 of FIG. 5, the flicker filter 50d sums the undelayed video line 32a and the delayed video line 32c, and divides the sum using a divide-by-two 56d. The result is then summed with the delayed video line 32b using an adder 54e. That sum is then divided using another divide-by-two 56e to provide the output. This provides a weighting of 1-2-1.

The feature that is a common feature of each of the conventional flicker filter circuits 50 is that they are all linear functions that produce a linear combination of a summation of weighted values of previous control variables 34. By summing and weighting the control variables 34, traditional flicker filters 50 attempt to reduce flicker by reducing the high frequency component of the video signal 30. Since flicker is caused by high contrast, eliminating the high frequency component of the video signal 30 effectively blurs the signal by reducing the difference in the data values, but also smears the signal across more scan lines. The problem with smearing the signal is that it reduces resolution of the image. Therefore, traditional flicker filters 50 force a trade-off between the amount of flicker the signal will produce and the signal's resolution.

Besides reducing resolution, traditional flicker filters 50 also are indiscriminate in the data that is processed. Recall that only high-contrast, black-and-white portions of video lines 32 cause flicker. One way that flicker filters 50 are indiscriminate is that they filter every control variable 34 in a video line 32, regardless of the ratio of black and white in adjacent video lines 32. Not only do flicker filters 50 filter every control variable 34 in a video line 32, they also process color portions of the video signal 30, rather than only the black and white flicker-causing portions.

Traditional flicker filters 50 are also indiscriminate in that they process both horizontal and vertical portions of the video signal 30. Since flicker is a vertical phenomenon, rather than horizontal, a video signal 30 need not be processed in the horizontal domain to reduce flicker. Thus, traditional flicker filters 50 over process the input data and are therefore generally inefficient.

The present invention is a flicker reduction circuit for a display screen that is an adaptive, non-linear approach to reducing flicker. The present invention operates on the observation that when viewing the display screen 10, a user's eye is more sensitive to given deviations in dark sections of the screen than equivalent deviations in bright sections. That is, the eye is not linear in its sensitivity from black to white. The eye's sensitivity can therefore be represented by a non-linear curve.

The present invention takes advantage of this non-linear function of the eye. To reduce flicker caused by a bright pixel on one video line and a corresponding dark pixel on an adjacent video line, the flicker reduction circuit of the present invention is capable of reducing the luminance value (and/or chromanance values) for the bright pixel in a different amount than the luminance value of the dark pixel.

This unequal adjustment of luminance values for a pair of adjacent pixels is done by operating on a weighted difference value between two or more control variables, rather than operating on the sum of two or more control variables. Based on that difference, the flicker reduction circuit either adds a control value or subtracts a control value to the control variable being displayed in order to reduce the flicker causing component of the video signal.

Although the present invention is described in terms of a real-time system in which the input is an analog video signal 30, one of ordinary skill in the art will appreciate that the present invention will also operate in a non-real-time system in which the input is frames of digital data. To more particularly describe the present invention, refer now to FIG. 7 depicting one embodiment of such a circuit.

Figure 7:
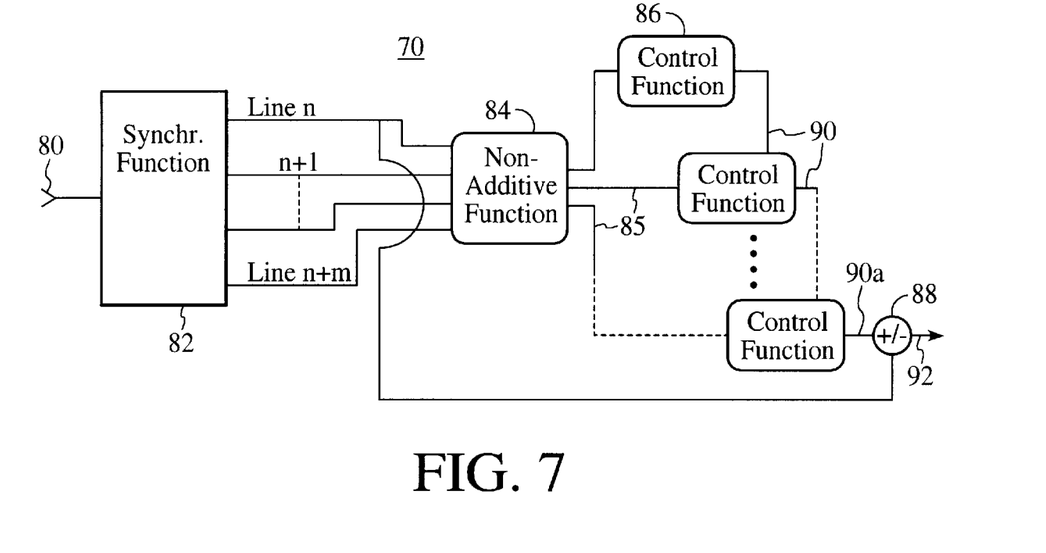
FIG. 7 is a functional block diagram illustrating a basic embodiment of a flicker reduction circuit in accordance with the present invention.

FIG. 7 is a functional block diagram illustrating a basic embodiment of a flicker reduction circuit in accordance with the present invention. The flicker reduction circuit 70 includes a synchronization function 82, a non-additive function 84, at least one control function 86, and an adder/subtractor 88.

The synchronization function 82 may comprise a frame buffer, RAM, or graphics controller, for example, that is capable of non-sequential pixel output More specifically, the synchronization function 82 accepts a linear progression of video lines 80 as input, and outputs a sequence of at least two synchronized video lines, shown here as video lines n to n+m. In a preferred embodiment, video lines n+1 to n+m are progressively delayed so that their sequence of control variables are synchronized in time with the control variables in video line n.

The non-additive function 84 is then applied to each set of synchronized control variables from the video lines n to n+m to determine a weighted difference value in intensity between two or more control variables from adjacent video lines. Examples of non-additive functions include subtraction and compression functions, for instance. The result of the non-additive function 84 is represented by a weighted value 85. Associated with the weighted value 85 is a sign bit.

For example, if the non-additive function 84 is a subtraction function, then subtracting, as opposed to adding, the intensity of the synchronized control variables results in a value that has either a positive or negative sign bit (e.g., subtracting a white pixel from a dark pixel results in a positive sign bit, and subtracting a dark pixel from a white pixel results in a negative sign bit). With conventional methods that provide a summation of weighted control variables, such information is not known.

The weighted value 85 and its sign bit is then input to one or more control functions 86. The control function 86 may contain a sign, amplitude or non-linear function, or embody such functions in a look-up table. Based on the weighted value 85 and the sign bit output by the non-additive function 84, each of the control functions 86 produces a control value 90. The control value 90 from one control function 86 may be input to another control function 86 in order to produce a final control value 90a.

The final control value 90a is then input into the adder/subtractor 88 where the control value 90a is applied to the control variable from video line n to produce a modified control variable 92 that will reduce flicker on the display screen 12.

According to the present invention, the control value 92 is a correction factor that will either be added or subtracted from the control variable that is to be displayed. The value of the correction factor produced by the control functions 86 range from zero to a maximum value, such that only the combinations of control variables that produce flicker (determined by difference values 85) are modified by the control value 92. Thus, the control functions 86 represent non-linear functions, as shown in FIG. 8.

Figure 8:
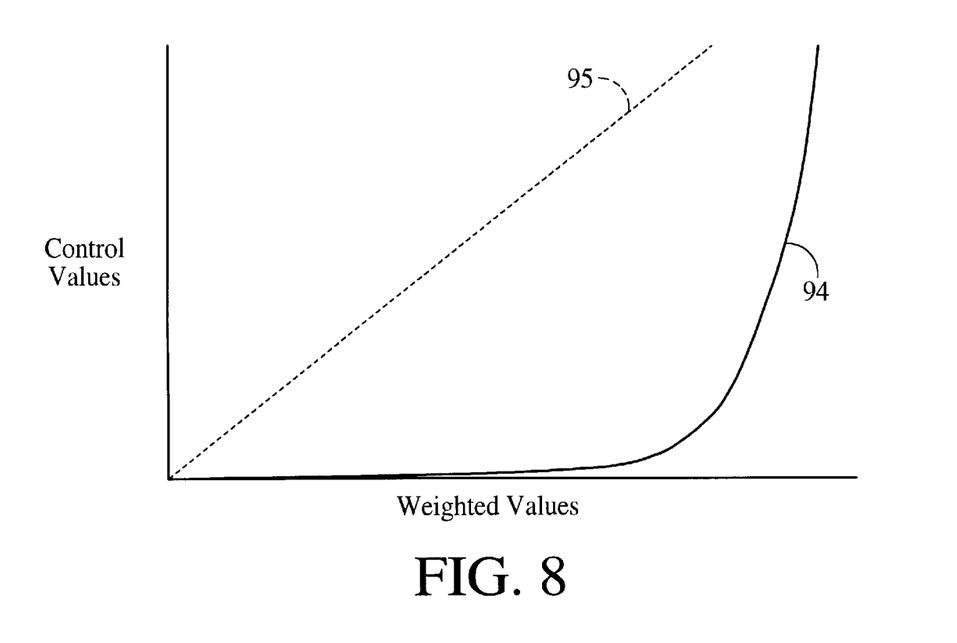
FIG. 8 is graph depicting an example non-linear function that is applied to the differences between control variables to produce a control value.

FIG. 8 is graph depicting an example non-linear function that is applied to the weighted value 85 associated with control variables to produce a control value 92. The X-axis in the graph represents the range of possible difference values 85 between two or more control variables. The Y-axis represents the range of control values 92 that is by the control function 92 based on the application of a non-linear function 94. The non-linear function 94 is shown here as the function $e^x$. As shown, only difference values 85 past a certain threshold will result in a control value that has a non-negligible value.

The dotted line 95 in the graph represents a linear function applied by conventional flicker filters, which results in the modification of all pixels, whether they need it or not. This is in contrast to the non-linear method of the present invention in which only those control variables determined to produce flicker are modified by the flicker reduction circuit. Although the function $e^x$ is shown, many non-linear functions, and combinations of non-linear functions, may be used to modify only those control variables that may result in flicker.

Specific embodiments of the flicker reduction circuit of FIG. 7 are explained below with reference to FIGS. 9, 10, and 11.

Figure 9:
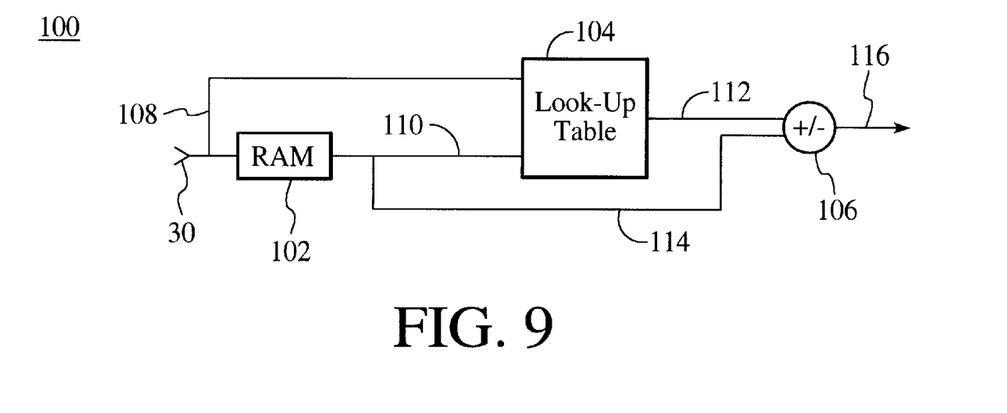
FIG. 9 is a diagram depicting a flicker reduction circuit in accordance with a first embodiment of the present invention.

FIG. 9 is a diagram depicting a flicker reduction circuit 100 in accordance with a first embodiment of the present invention. The flicker reduction circuit 100 includes a memory 102, which in a preferred embodiment is a RAM, a look-up table (LUT) 104 and an adder/subtractor 106.

In a preferred embodiment, the input to the flicker reduction circuit 100 is a video signal 30 that is input a progressive rate of twice the refresh frequency, meaning that the video is displayed non-interlaced. As stated above, each video line 32 in the signal 30 includes a plurality of control variables 34 for controlling the intensity of each of the pixels in the corresponding scan line 12. As describe herein, the control variables 34 are 8-bits in length, although other bit-length may also be used.

The flicker reduction circuit 100 operates on pairs of video lines 108 and 110 from the video signal 30 in sequence, such as lines one and two, followed by fines three and four, and so on. The memory 102 receives one of the video lines 110 from the pair as an input, and delays the video line 110 so that its sequence of control variables 34 are synchronized in time with the control variables 34 in the undelayed video line 108.

According to the present invention, each pair of synchronized control variables 34 from the delayed and undelayed video lines 110 and 108 are then input to the look-up table 104. In this embodiment, the look-up table 104 includes a plurality of control values that are stored at specific addresses in the look-up table 104. Each address in the look-up table 104 represents a value that can be produced from the combination of luminance values (and/or chromanance values) for a pair of control variables. When a pair of control variables are input into the look-up table 104, the combination of their luminance values are used as an index to the addresses in the look-up table 104, and the corresponding control value 112 stored at that indexed address is output Alternatively, the look-up table 104 could be implemented as a function, rather than a table, that outputs a control value 112 after testing the values of the control variables. However, the look-up table approach is preferable since the entries in the table can be easily changed, whereas the function approach would require a modification of the function itself.

After the control variable 112 is output from the look-up table 104, the control value 112 is input to the adder/subtractor 106. The second input to the adder/subtractor 106 is the original control variable from the delayed video line 110, which is provided via a feed forward 114. The adder/subtractor 106 then modifies the control variable 110 by the control value 112 through addition or subtraction, depending on the value of the control value 112 (i.e., adding a negative number is the same as subtracting a positive number). The final output 116 from the flicker reduction circuit 100 is a processed control variable whose luminance data has been altered by the control value 112 to preclude flicker. Assuming the Nth control variable 34 from the two video lines 32 was processed by the flicker reduction circuit 100, the output of the flicker reduction circuit 100 controls the intensity of Nth pixel in the corresponding scan line 12.

Note that the input to the look-up table 104 is two 8-bit control variables. Since the look-up table 104 contains entries for each combination of control variables, the look-up table 104 must have 64 k ($2^{16}$) entries. The second preferred embodiment of the present invention is a flicker reduction circuit that provides a look-up table 104 that is significantly smaller, as shown in FIG. 10.

Figure 10:
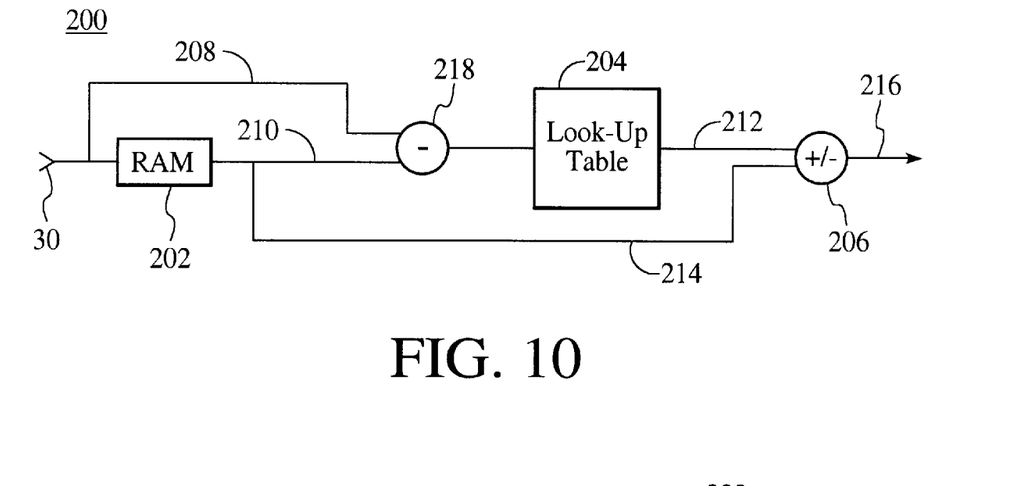
FIG. 10 is a diagram of a flicker reduction circuit in accordance with a second preferred embodiment of the present invention.

FIG. 10 is a diagram of a flicker reduction circuit 200 in accordance with a second preferred embodiment In addition to a memory 202, a look-up table (LUT) 204 and an adder/subtractor 206, the flicker reduction circuit 200 includes a subtractor 218 coupled between the memory 202 and the look-up table 204. A control variable from an undelayed video line 208 and a control variable from a delayed video line 210 are input to the subtractor 218 and the luminance values from each of the control variables are subtracted from one another. The result of the subtraction is then input to the look-up table 204.

The look-up table 204 includes a series of entries that correspond to the range of possible differences between the luminance values of the two control variables. Based on the difference, the look-up table 204 outputs a corresponding control value 212. As in the first embodiment, the control value 212 is input to the adder/subtractor 206 along with the original control variable from the delayed video line 210 via a feed forward 214, to produce a modified control variable 216. Rather than filtering the synchronized control variables, the flicker reduction circuit 200 of the present invention operates on the difference between two synchronized control variables, which reduces the number of gates required to implement the circuit 200 and thereby reduces cost.

When the subtractor 218 subtracts the two control variables, the result is a 9-bit value, an 8-bit value plus a sign bit. Therefore, the look-up table need only contain $2^9$ entries, which is 512 addresses, rather than 64 k. A third preferred embodiment of the present invention provides a flicker reduction circuit having an even smaller look-up table, as shown in FIG. 11.

Figure 11:
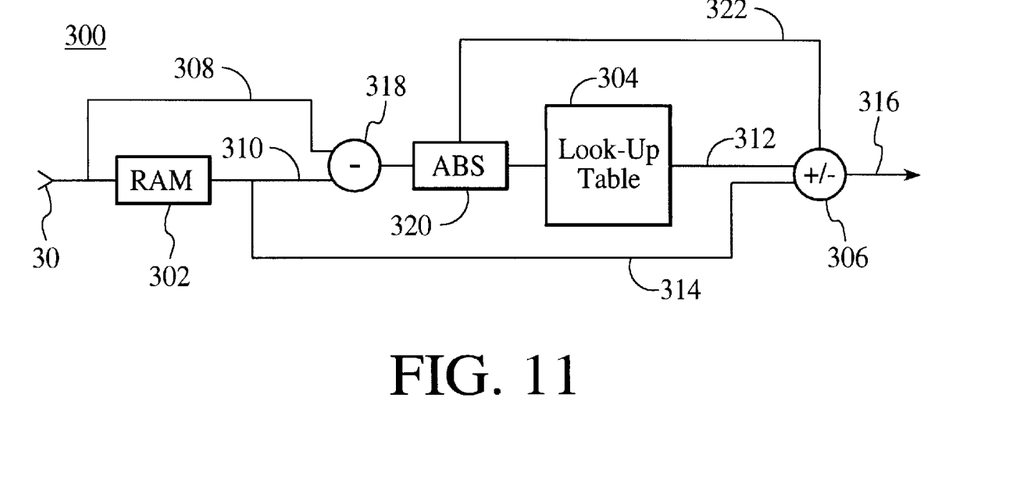
FIG. 11 is diagram illustrating a flicker reduction circuit in a third preferred embodiment of the present invention.

FIG. 11 is diagram illustrating a flicker reduction circuit 300 in a third preferred embodiment. In addition to a memory 302, a look-up table 304, an adder/subtractor 306, and a subtractor 318, the flicker reduction circuit 300 includes an absolute value function (ABS) 320 coupled between the subtractor 318 and the look-up table 304. As in the second embodiment, the luminance values of two control variables from an undelayed video line 308 and a delayed video line 310 are input to the subtractor 318, and subtracted from one another.

The result of the subtraction is then input to the ABS 320, which passes the absolute value of the result to the look-up table 304. The ABS 320 also passes the sign bit for the result to the adder/subtractor 306 via line 322. The look-up table 304 operates as in the second embodiment and outputs a control value 312 based on the difference indicated by the result of the subtraction. The control value 312 is then input to the adder/subtractor 306 along with the original control variable from the delayed video line 310, provided via a feed forward 314, to produce a modified control variable 316.

Since the ABS 320 saves the sign bit, only the absolute value of the subtraction result, which is an 8-bit value, is input to the look-up table 304. Therefore, in the third preferred embodiment, the look-up table 304 need only contain $2^8$ entries, or 256 addresses, which is significantly less than 512 and 64k, as in the first two embodiments, respectively.

The flicker reduction circuits according to the preferred embodiments of the present invention are non-linear, adaptive, and synthetic. The flicker reduction circuits are non-linear in that if the ratio of black to white for control variables in adjacent video lines does not pass a certain threshold, then those control variables are not modified. The flicker reduction circuits are adaptive in that they do not use a set mathematical formula to reduce flicker in those control variables likely to cause flicker, as in conventional filters. In addition, the flicker reduction circuits use a synthetic approach rather than a convolution function, that is, control variables are replaced with a value that is similar to the original value of the control variables, but without the perturbations that cause flicker.

A non-linear, adaptive, synthetic flicker reduction circuit for display screens has been disclosed. Although the present invention has been described in accordance with the embodiments shown, one of ordinary skill in the art will readily recognize that there could be variations to the embodiments and those variations would be within the spirit and scope of the present invention.

For example, although the flicker reduction circuit has been described as operating on the difference between luminance values, the difference between other values from the video signal may also be used to generate a control value. In addition, those with ordinary skill in the art will recognize that the flicker reduction circuit will operate effectively with display systems that are not raster scan-based. Accordingly, many modifications may be made by one of ordinary skill in the art without departing from the spirit and scope of the appended claims.

What is claimed is:

1. A flicker reduction circuit comprising:
   a set of N video lines, wherein each of the N video lines includes a respective sequence of control variables;
   a synchronization function coupled to the N video lines for synchronizing the respective control variables therein;
   at least one control means coupled to the synchronization function for applying a non-additive function to the synchronized control variables and for providing a respective weighted, adaptive, and synthetic control value based on the result of the non-additive function; and
   means for applying the respective weighted, adaptive, and synthetic control value to the sequence of control variables to provide modified control variables that reduce flicker.

2. A circuit as in claim 1 wherein each control variable in the sequence of control variables contains luminance values for a pixel on a display screen, and wherein the respective weighted, adaptive, and synthetic control value applied to the sequence of control variables reduces the luminance value for bright pixels in a different amount than the luminance value is increased for dark pixels.

3. A circuit as in claim 1 wherein the control means includes a non-additive function controled to at least one control function.

4. A circuit as in claim 3 wherein the non-additive function determines a weighted difference value between control variables from two or more of the N video lines.

5. A circuit as in claim 4 wherein the non-additive function is a subtraction function.

6. A circuit as in claim 3 wherein the control function produces the weighted, adaptive, and synthetic control value as a function of the weighted value.

7. A circuit as in claim 6 wherein the weighted, adaptive, and synthetic control value is produced by the control function using a non-linear function.

8. A circuit as in claim 7 wherein the control function is a look-up table that stores a plurality of predetermined weighted, adaptive, and synthetic control values.

9. A circuit as in claim 8 wherein the weighted, adaptive, and synthetic control values are adaptively modified using information derived from a characterization of the control variables.

10. A circuit as in claim 3 wherein the synchronization function synchronizes the n video lines by progressively delaying each of the video lines in sequence.

11. A flicker reduction circuit in a display system including a display, the display including a series of scan lines, each of the scan lines including a plurality of pixels, the flicker reduction circuit comprising:
    a video signal for controlling the display, the video signal including a first and second video line corresponding to a first and second scan line, the first video line including a first control variable for controlling the intensity of a first pixel in the first scan line, the second video line including a second control variable for controlling the intensity of a second pixel in the second scan line;
    means for synchronizing the second control variable with the first control variable;
    means for providing a weighted, adaptive, and synthetic control value based on the difference between the first and second control variables; and
    means for applying the weighted, adaptive, and synthetic control value to one of the first and second control variables to provide a modified control variable that reduces flicker on the display screen.

12. A circuit as in claim 11 wherein the means for synchronizing is a memory.

13. A circuit as in claim 11 wherein the means for providing the weighted, adaptive, and synthetic control value includes a look-up table.

14. A circuit as in claim 11 wherein the means for providing the weighted, adaptive, and synthetic control value includes a subtractor.

15. A circuit as in claim 11 wherein the means for applying the weighted, adaptive, and synthetic control value includes a feed forward.

16. A circuit as in claim 15 wherein the means for applying the weighted, adaptive, and synthetic control value further includes an adder.

17. A circuit as in claim 15 wherein the means for applying the weighted, adaptive, and synthetic control value further includes a subtractor.

18. A method for reducing flicker on display, the display including a series of scan lines, each of the scan lines including a plurality of pixels, wherein the display is controlled by a video signal, the video signal including a first and second video line corresponding to a first and second scan line, the first video line including a first control variable for controlling the intensity of a first pixel in the first scan line, the second video line including a second control variable for controlling the intensity of a second pixel in the second scan line, the method comprising the steps of:
    synchronizing the second control variable with the first control variable;
    providing a weighted, adaptive, and synthetic control value based on the difference between the first and second control variables; and
    applying the weighted, adaptive, and synthetic control value to one of the first and second control variables to provide a modified control variable that reduces flicker on the display screen.

19. A flicker reduction circuit in a display system including a display, the display including a series of scan lines, each of the scan lines including a plurality of pixels, wherein the display is controlled by a video signal including a first and second video line corresponding to a first and second scan line, the first video line including a second video line including a second control variable for controlling the intensity of a second pixel in the second scan line; the flicker reduction circuit comprising:

a memory coupled to the second scan line for synchronizing the second control variable with the first control variable;

a look-up table for receiving the first and second control variables and for outputting a weighted, adaptive, and synthetic control value based on the difference between the first and second control variables; and modifying means coupled to the look-up table and to the memory for modifying the second control variable by the weighted, adaptive, and synthetic control value to provide a modified control variable that reduces flicker on the display screen.

20. A circuit as in claim 19 wherein the memory is a random access memory.

21. A circuit as in claim 19 wherein the look-up table is a function.

22. A circuit as in claim 19 wherein the modifying means includes a feed forward.

23. A circuit as in claim 22 wherein the modifying means further includes an adder.

24. A circuit as in claim 22 wherein the modifying means further includes a subtractor.

25. A flicker reduction circuit in a display system including a display, the display including a series of scan lines, wherein the display is controlled by a video signal including a first and second video line corresponding to a first and second scan line, the first video line including a first control variable for controlling the intensity of a first pixel in the first scan line, the second video line including a second control variable for controlling the intensity of a second pixel in the second scan line; the flicker reduction circuit comprising:

a memory for receiving the first and second scan lines as input and for synchronizing the second control variable with the first control variable;

a subtractor for receiving the synchronized first and second control variables as input and for subtracting the first and second control variables from one another to provide a subtracted value;

a look-up table coupled to the subtractor for outputting a weighted, adaptive, and synthetic control value based on the subtracted value; and modifying means coupled to the look-up table and to the memory for modifying the second control variable by the weighted, adaptive, and synthetic control value to provide a modified control variable that reduces flicker on the display screen.

26. A circuit as in claim 25 wherein the look-up table is a function.

27. A circuit as in claim 26 wherein the memory is a random access memory.

28. A circuit as in claim 26 wherein the modifying means includes a feed forward, and an adder/subtractor.

29. A flicker reduction circuit in a display system including a display, the display including a series of scan lines, wherein the display is controlled by a video signal including a first and second video line corresponding to a first and second scan line, the first video line including a first control variable for controlling the intensity of a first pixel in the first scan line, the second video line including a second control variable for controlling the intensity of a second pixel in the second scan line; the flicker reduction circuit comprising:

a memory for receiving the first and second scan lines as input and for synchronizing the second control variable with the first control variable;

a subtractor for receiving the synchronized first and second control variables as input and for subtracting the first and second control variables from one another to provide a subtracted value and a sign bit;

an absolute value function coupled to the subtractor;

a look-up table coupled to the absolute value for receiving the subtracted value and for outputting a weighted, adaptive, and synthetic control value based on the subtracted value; and modifying means for receiving the sign bit from the absolute value function and for receiving the weighted, adaptive, and synthetic control value from the look-up table, and for modifying the second control variable by the weighted, adaptive, and synthetic control value to provide a modified control variable that reduces flicker on the display screen.

30. A circuit as in claim 29 wherein the memory is a random access memory.

31. A circuit as in claim 30 wherein the modifying means includes a feed forward, and an adder/subtractor.

32. A circuit as in claim 30 wherein the look-up table is a function.

\* \* \* \* \*